(12) United States Patent
Blake (10) Patent No.: US 6,708,998 B1
(45) Date of Patent: Mar. 23, 2004

(54) SIMPLIFIED PEDAL-TO-CRANK MOUNTING ASSEMBLY CYCLE

(75) Inventor: T. Gregory Blake, Madison, WI (US)

(73) Assignee: Pacific Cycle LLC, Vernon Hills, IL (US)

( * ) Notice: Subject to any disclaimer, the term of this patent is extended or adjusted under 35 U.S.C. 154(b) by 0 days.

(21) Appl. No.: 10/160,147

(22) Filed: May 31, 2002

(51) Int. Cl.⁷ .................................................. G05G 1/14

(52) U.S. Cl. ...................... 280/259; 280/294; 403/324; 74/594.4

(58) Field of Search ................................ 280/259, 294; 74/560, 561, 594.1, 594.2, 594.3, 594.4, 594.5, 594.6, 594.7; 384/458; 403/321, 322.1, 322.3, 324, 325, 326, 327, 328

(56) References Cited

U.S. PATENT DOCUMENTS

| 5,315,896 A | * | 5/1994 | Stringer | 74/594.4 |
| 5,440,950 A | * | 8/1995 | Tranvoiz | 74/594.4 |
| 5,499,834 A | * | 3/1996 | Pasin et al. | 280/282 |
| 5,586,472 A | * | 12/1996 | Lin | 74/594.1 |
| 5,588,338 A | * | 12/1996 | Carr et al. | 74/560 |
| 6,568,296 B1 | * | 5/2003 | Lin | 74/594.1 |

* cited by examiner

Primary Examiner—Lesley D. Morris
Assistant Examiner—Tony Winner
(74) Attorney, Agent, or Firm—Andrus, Sceales, Starke & Sawall, LLP (57) ABSTRACT

In a wheeled cycle, including a bicycle, having an opposing pair of cranks with pedals for engagement by the feet of a rider for manual propulsion, a tool-free pedal-to-crank mounting assembly and method is provided for mounting the pedal to the crank with an insertion motion requiring no tools. Disassembly desirably requires a tool.

18 Claims, 10 Drawing Sheets

SIMPLIFIED PEDAL-TO-CRANK MOUNTING ASSEMBLY CYCLE

BACKGROUND AND SUMMARY

The invention relates to cycles, including bicycles, and more particularly to customer friendly simplified assembly systems, including no-tool quick assembly apparatus and methods.

The present invention arose out of development efforts directed toward simplified assembly of cycles, including bicycles and the like. Shipping a cycle in fully assembled condition is typically cost-prohibitive, and hence the cycle is usually shipped in pieces, which in turn requires assembly either at the retail outlet or at home by the consumer. There is an increasing demand for simplified, quick assembly. There is also demand for fool-proof assembly, particularly by parents when the rider is a child, to assure a safe, reliable, properly assembled unit. There is also demand, particularly by parents of younger children, for units that can only be disassembled by use of a tool.

The present invention provides a simplified, quick mounting assembly for mounting the pedal to the crank. In the preferred embodiment, the invention enables such assembly without tools. Also in the preferred embodiment, the invention enables assembly only in a prescribed manner, to prevent improper installation. In preferred form, assembly is accomplished with a simple snap-in insertion step, and affirmative installation feedback is provided by an audible and tactile click confirming appropriate alignment and snap-in engagement, and proper, successful installation. Also in the preferred embodiment, disassembly desirably requires a tool. Furthermore, the invention lowers shipping cost by enabling more compact, lower profile packaging in pre-assembled condition.

BRIEF DESCRIPTION OF THE DRAWINGS

FIG. 12 is similar to FIG. 11 and shows the structure during assembly.

FIG. 13 is like FIG. 12 and shows the structure upon completion of assembly. FIG. 13 is taken along line 13—13 of FIG. 1.

FIG. 14 is a sectional view taken along line 14—14 of FIG. 13.

FIG. 21 is like FIG. 20 and shows the structure upon completion of assembly. FIG. 21 is taken along line 21—21 of FIG. 1.

DETAILED DESCRIPTION

Figure 1:
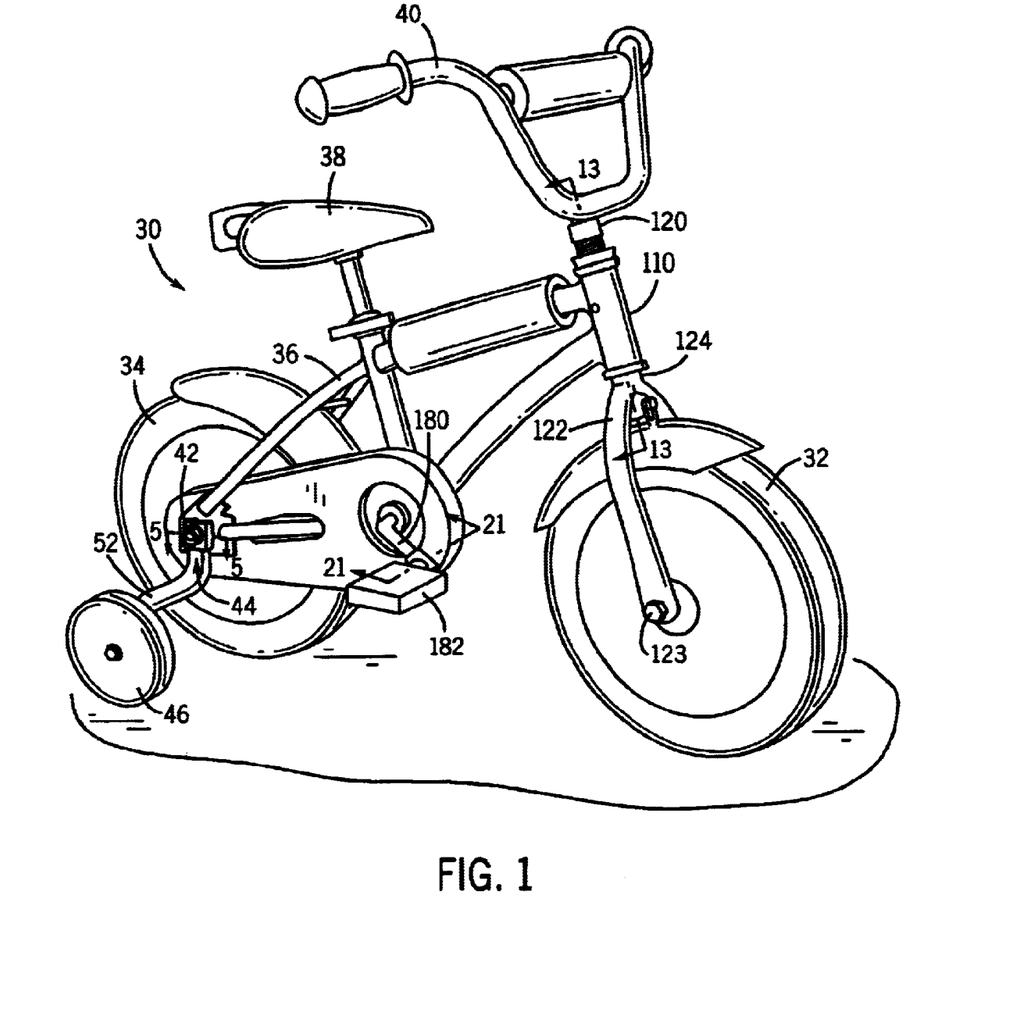
FIG. 1 is a perspective view of an assembled cycle in accordance with the invention.

FIG. 1 shows a bicycle 30 having front and rear wheels 32 and 34, a frame 36, a seat 38, and handlebars 40. The frame supports a rear wheel axle 42. A tool-free trainingwheel-to-frame mounting assembly 44, FIGS. 2–4, mounts trainingwheel 46, FIG. 1, to the frame with an insertion motion requiring no tools, to be described. A left side identical trainingwheel and mounting assembly is also provided (not shown).

Figures 2, 3:
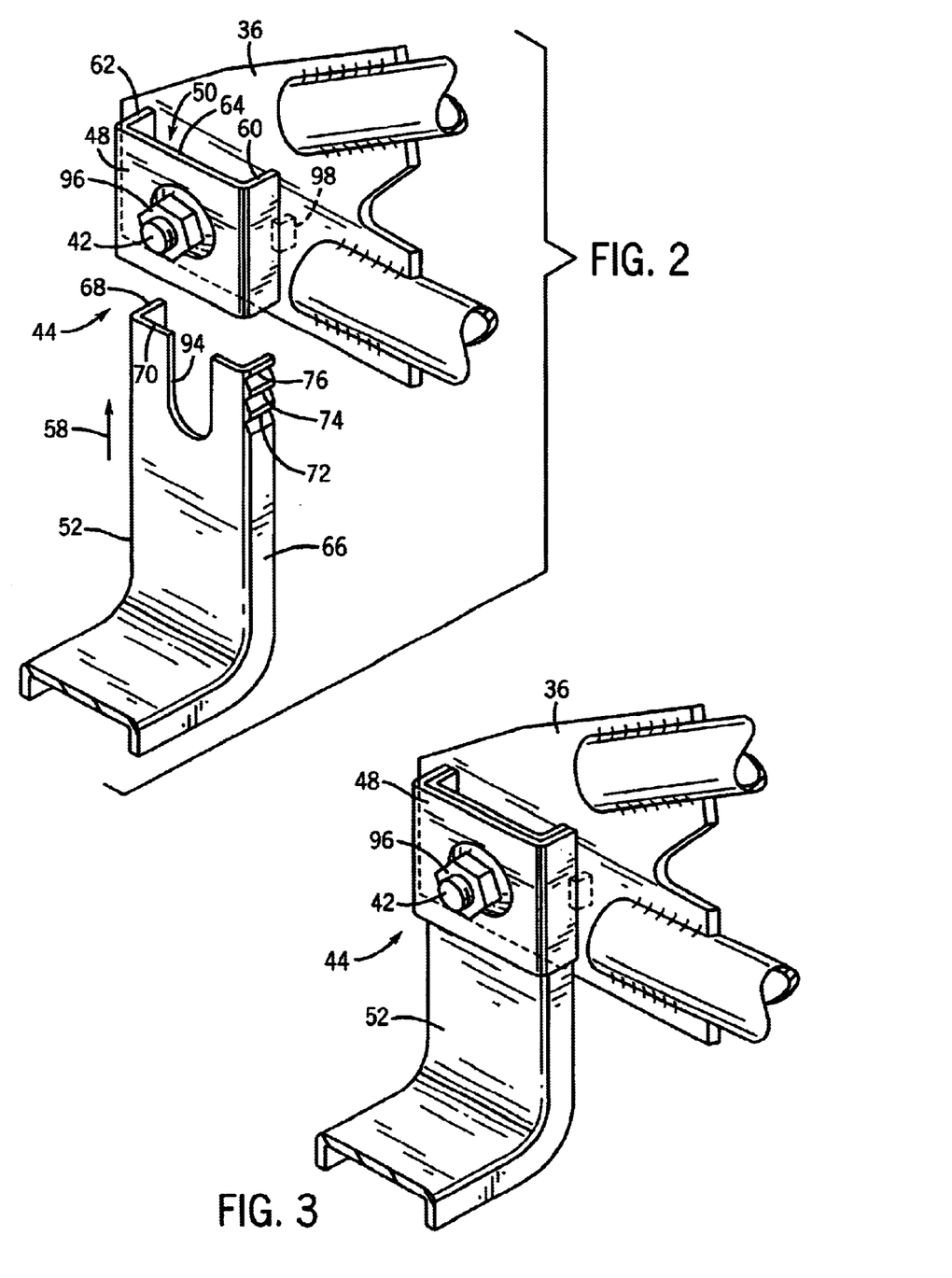
FIG. 2 is an exploded perspective view of a portion of the cycle of FIG. 1.
FIG. 3 is a view similar to FIG. 2 but showing the structure in assembled condition.
Figure 4:
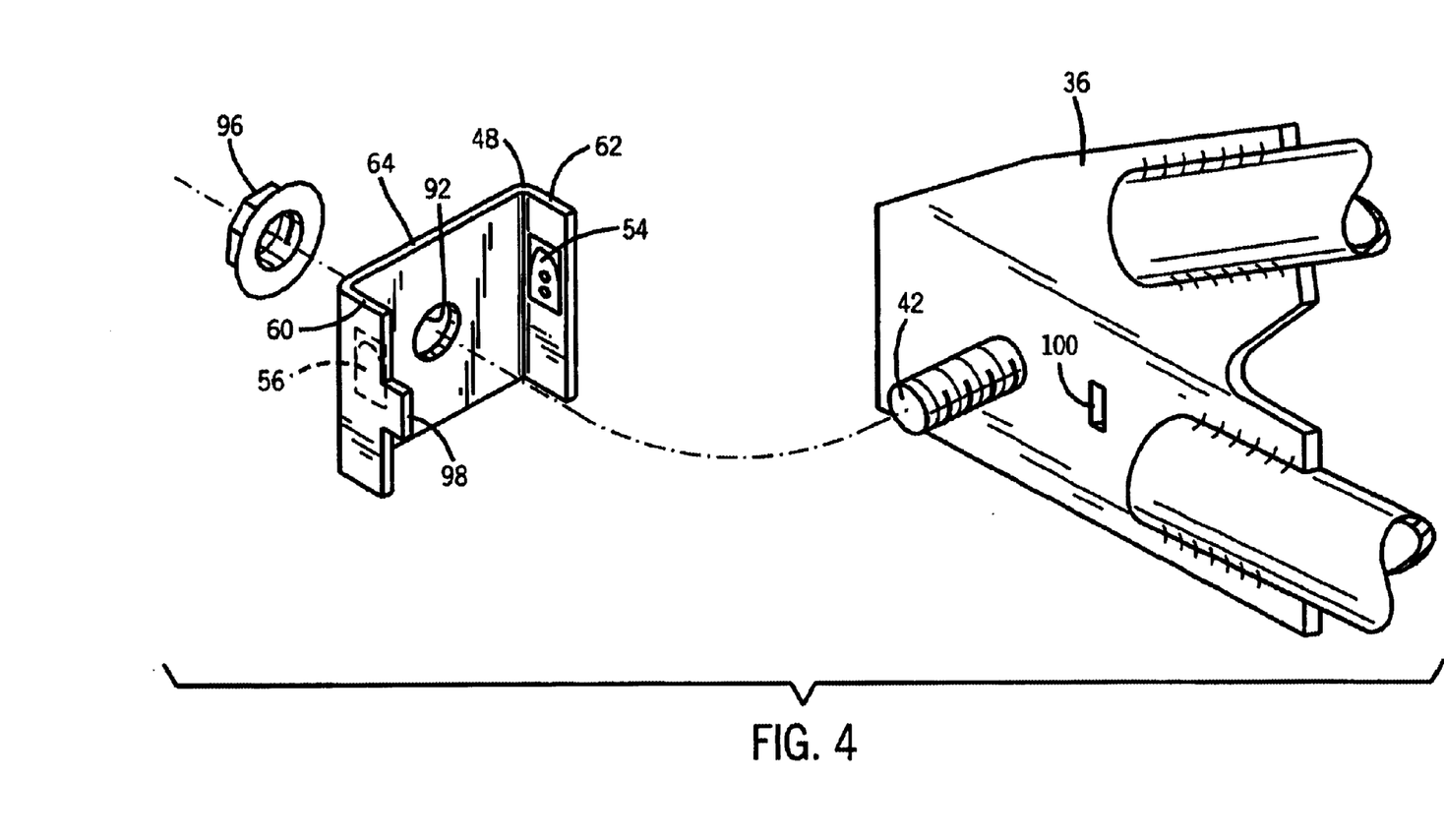
FIG. 4 is an exploded perspective view illustrating disassembly of the structure of FIG. 3.
Figure 5:
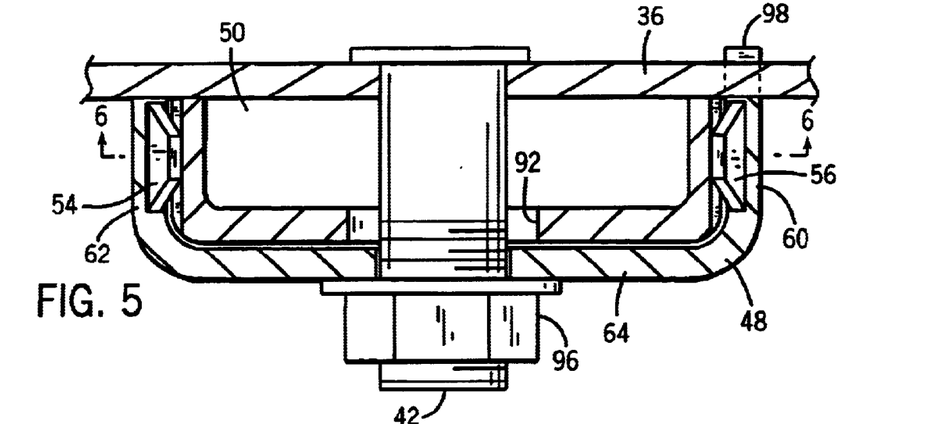
FIG. 5 is a sectional view taken along line 5—5 of FIG. 1.
Figure 7:
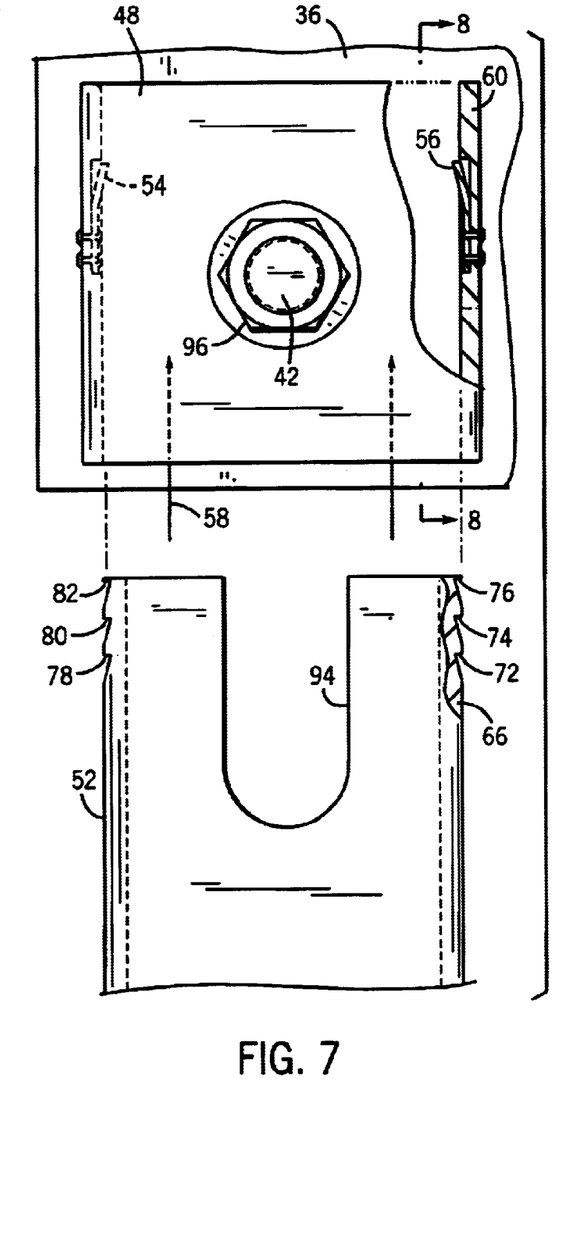
FIG. 7 is a side elevation view of a portion of the structure of FIG. 1 partially cut away and exploded to illustrate assembly.
Figure 8:
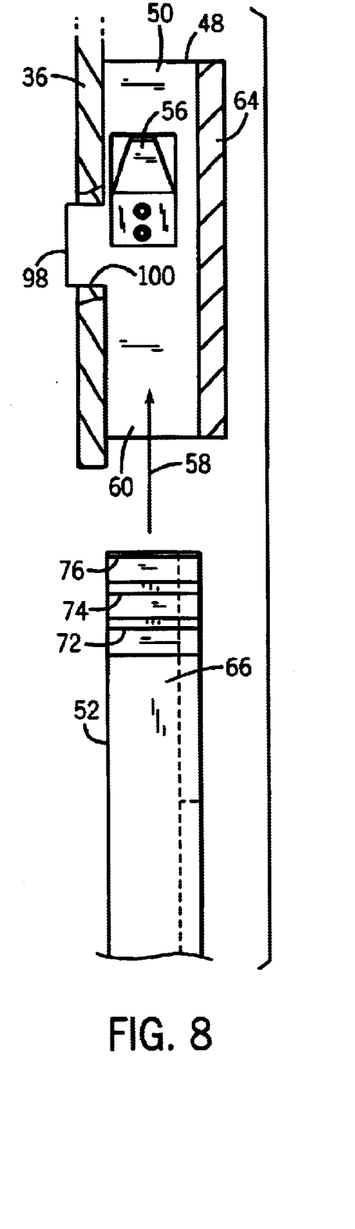
FIG. 8 is a sectional view taken along line 8—8 of FIG. 7.

The trainingwheel-to-frame mounting assembly 44 includes a bracket 48, FIG. 2, mounted to frame 36 and defining a channel 50, FIGS. 2, 5, 8. Trainingwheel 46 has an arm 52, FIGS. 2, 3, inserted into channel 50. Bracket 48 has a pair of locking members 54, 56, FIGS. 4, 6, engaging arm 52 upon insertion of arm 52 into channel 50, FIGS. 2, 7, 8, and preventing separation of the bracket and arm and withdrawal of arm 52 from bracket 48. The direction of insertion 58, FIGS. 2, 7, 8 is upward and transverse to rear wheel axle 42.

Channel 50 is between bracket 48 and frame 36 and is formed by a U-shaped bracket member having a pair of legs 60, 62, FIGS. 2, 4, 5, extending outwardly from frame 36 and joined by an outer bight 64 spaced outwardly of frame 36 and defining channel 50 therebetween. Arm 52 is also a U-shaped member having a pair of legs 66 and 68 joined by an outer bight 70. During the noted insertion motion, bight 70 of arm 52 slides along bight 64 of bracket 48, leg 66 slides along leg 60, and leg 68 slides along leg 62. In the fully inserted assembled condition, bight 70 preferably rests flush against bight 66, leg 66 rests flush against leg 60, and leg 68 rests flush against leg 62.

Figure 6:
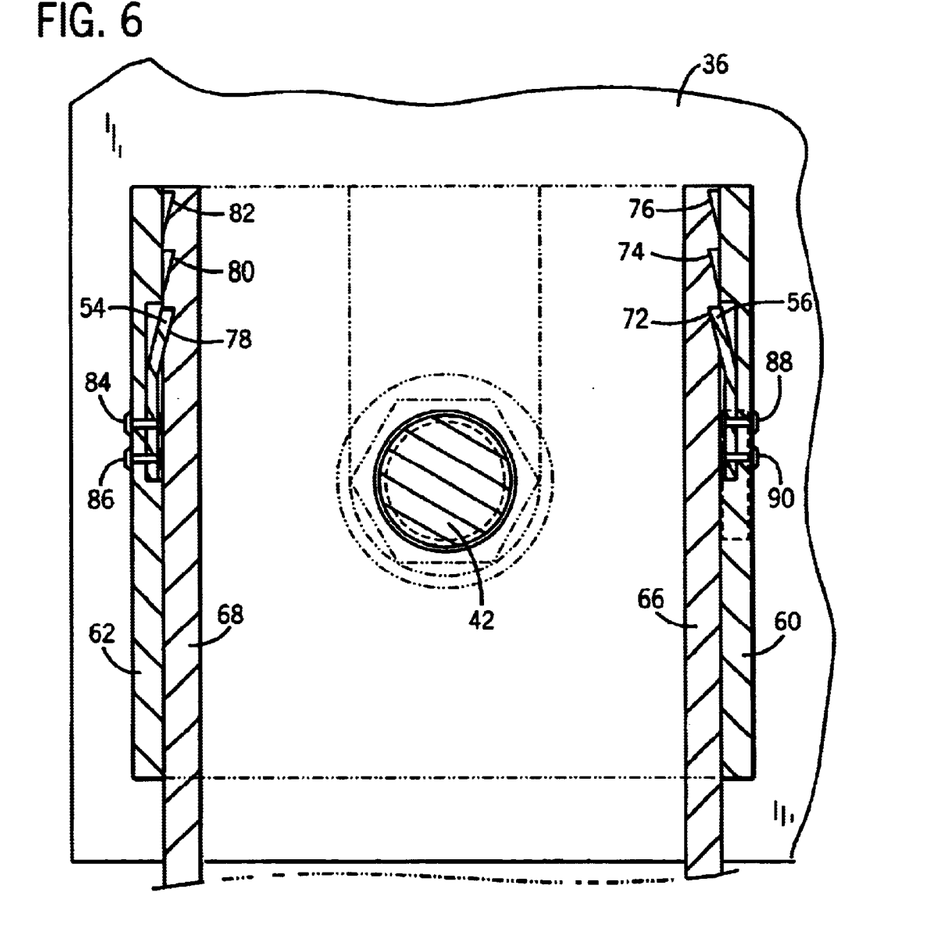
FIG. 6 is a sectional view taken along line 6—6 of FIG. 5.

Locking members 54, 56 are engaged between arm 52 and respective legs 62, 60 of bracket 48, FIG. 6. Locking member 56, FIG. 7, has a locking position biased into the path of movement of arm 52, and upon the noted insertion is engaged and deflected by arm 52 rightwardly in FIG. 7 against the noted bias. Arm 52 has one or more detents 72, 74, 76, FIGS. 6–8, preferably grooves or notches, engaged by locking member 56 upon completion of insertion and permitting locking member 56 to return to its locking position due to the noted bias (leftwardly in FIG. 6). Locking member 56 is preferably a spring tab permitting one-way insertion of arm 52 into channel 50 along legs 60, 62 and preventing withdrawal in the opposite direction. As noted, the detents preferably comprise one or more notches 72, 74, 76 in arm 52 engaged by spring tab 56. Spring tab 56 flexes into and out of channel 50 along a direction parallel to bight 64. If arm 52 is only partially inserted into channel 50, for example such that only notch 76 is engaged by spring tab 56, the arm will nevertheless still be locked in the channel and prevented from being withdrawn. When the bike is stood upright on the ground, the arm 52 will automatically be slid further upwardly in channel 50, such that notch 76 moves upwardly, FIGS. 6, 7, and spring tab 56 will engage and lock into the lowermost notch 72. Spring tab 54 is identical, and engages in like manner its respective one or more detent notches 78, 80, 82. Spring tabs 54 and 56 are mounted to respective legs 62 and 60 of bracket 48 in any known manner such as pins or rivets 84 and 86, 88 and 90, respectively. In an alternate embodiment, the one or more locking members 54, 56 are provided on arm 52, and the detents are provided on bracket 48.

Bracket 48 is mounted to frame 36 at rear wheel axle 42. Bight 64 has an aperture 92, FIGS. 4, 5, through which rear wheel axle 42 extends. Arm 52 has an open-ended slot 94, FIGS. 2, 7, receiving rear wheel axle 42 therein as arm 52 is inserted upwardly and slid into channel 50 transversely to rear wheel axle 42. Axle nut 96 engages rear wheel axle 42 in threaded relation and mounts bracket 48 to frame 36. Leg 60 of bracket 48 has a locking tab 98, FIGS. 4, 5, engaging frame 36 by being inserted through aperture 100, to prevent rotation of bracket 48 about rear wheel axle 42. Nut 96 is removable to prevent disengagement of bracket 48 from frame 36 and removal of trainingwheel arm 52.

Installation of trainingwheel arm 52 requires no tools. Disassembly of trainingwheel arm 52 from the bicycle does require a tool, namely a socket or wrench to loosen axle nut 96. The no-tools installation in combination with a tool requirement for disassembly is considered a desirable advantage, particularly in the case of young riders where parents do not wish children to be able to disassemble the bicycle. The no-tools installation enabled by the tool-free trainingwheel-to-frame mounting assembly is considered highly desirable, particularly for non-mechanically inclined parents.

The tool-free trainingwheel-to-frame mounting assembly mounts the trainingwheel to the frame with snap-in insertion as spring tabs 54 and 56 spring back inwardly into respective notches 78, 72. There is an audible and tactile click during insertion, providing positive feedback to the assembler. The insertion is unidirectional; and once the arm 52 is inserted, it is locked against withdrawal in the opposite direction. The locking mechanism provided by the one or more locking members 54, 56 permits the noted insertion, and locks trainingwheel arm 52 against withdrawal from the bicycle frame, all without tools. A release mechanism is provided by the assembly at axle nut 96 which is accessible by and requires a tool to unlock the trainingwheel from the frame after the noted insertion.

Figures 9, 10:
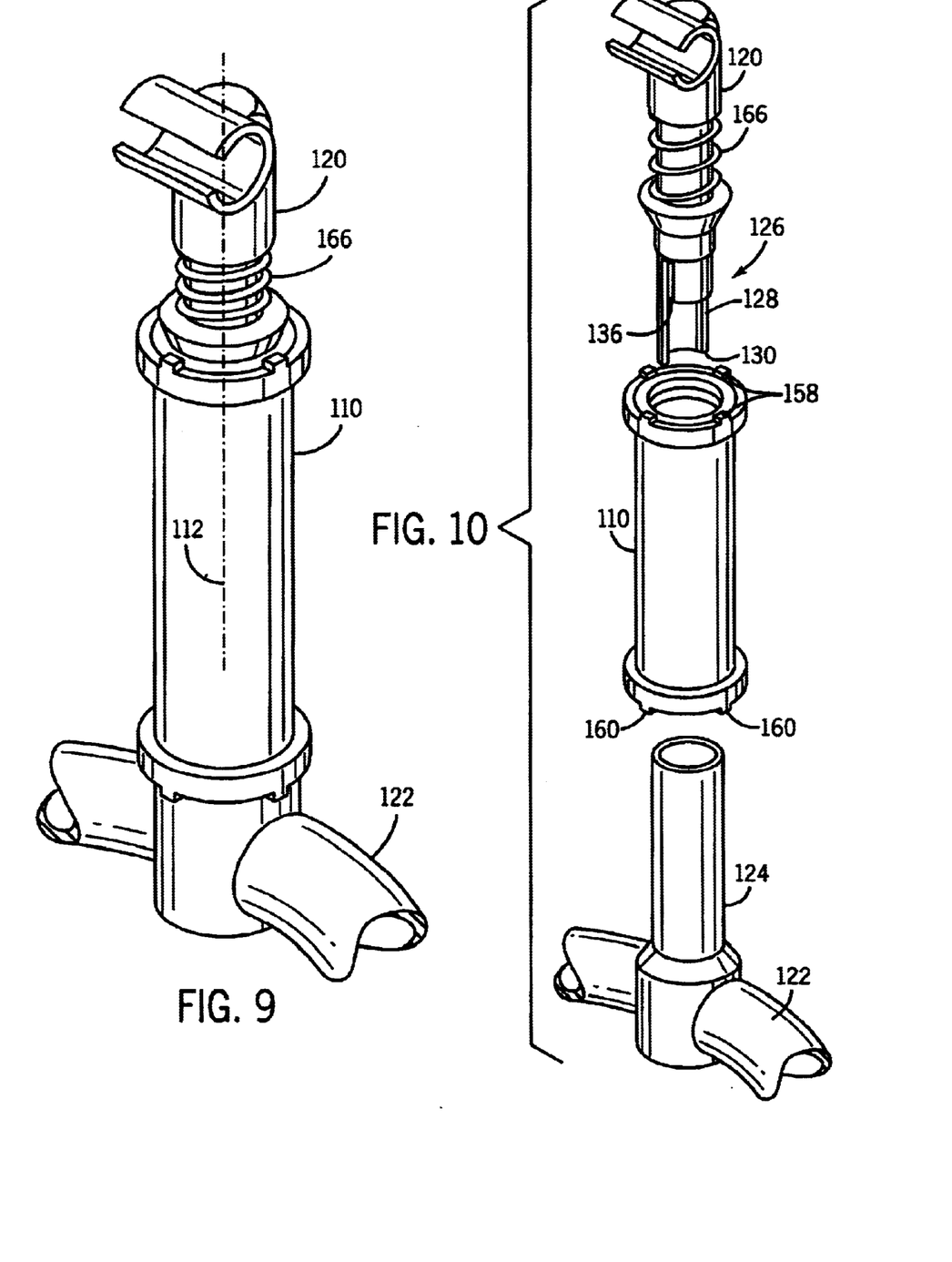
FIG. 9 is a perspective view of a portion of the structure of FIG. 1.
FIG. 10 is an exploded perspective view of the structure of FIG. 9.

Frame 36 of cycle 30 has a headtube 110, FIGS. 1, 9. Headtube 110 is a tubular member extending along a steering axis 112 and having a cylindrical sidewall 114, FIGS. 11–13, with upper and lower ends 116 and 118. Front handlebars 40 have a lower central stem 120 extending downwardly into headtube 110. Front wheel fork 122 supports front wheel axle 123 and has an upper central yoke 124 extending upwardly into headtube 110. A stem-to-yoke mounting assembly 126, to be described, mounts front handlebar stem 120 to front wheel fork yoke 124 in mating relation rotationally supported in headtube 110. Tool-free stem-to-yoke mounting assembly 126 mounts stem 120 to yoke 124 within headtube 110 with an insertion motion requiring no tools.

Figure 11:
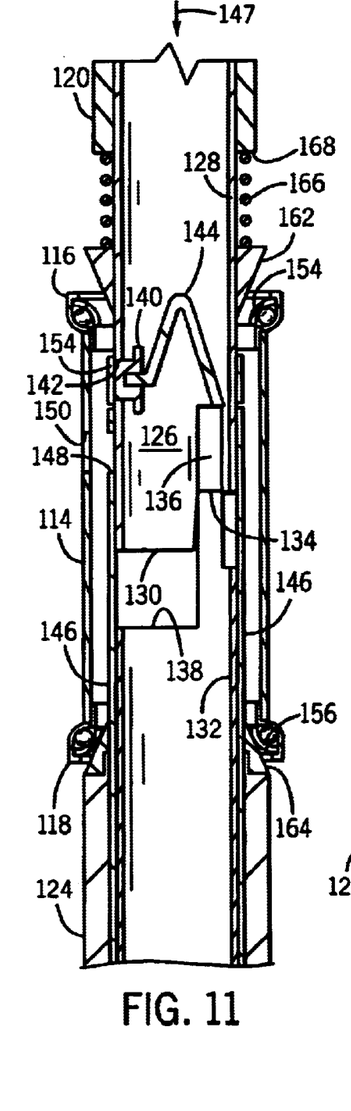
FIG. 11 is a sectional view of the structure of FIG. 9 illustrating assembly.
Figures 15, 18:
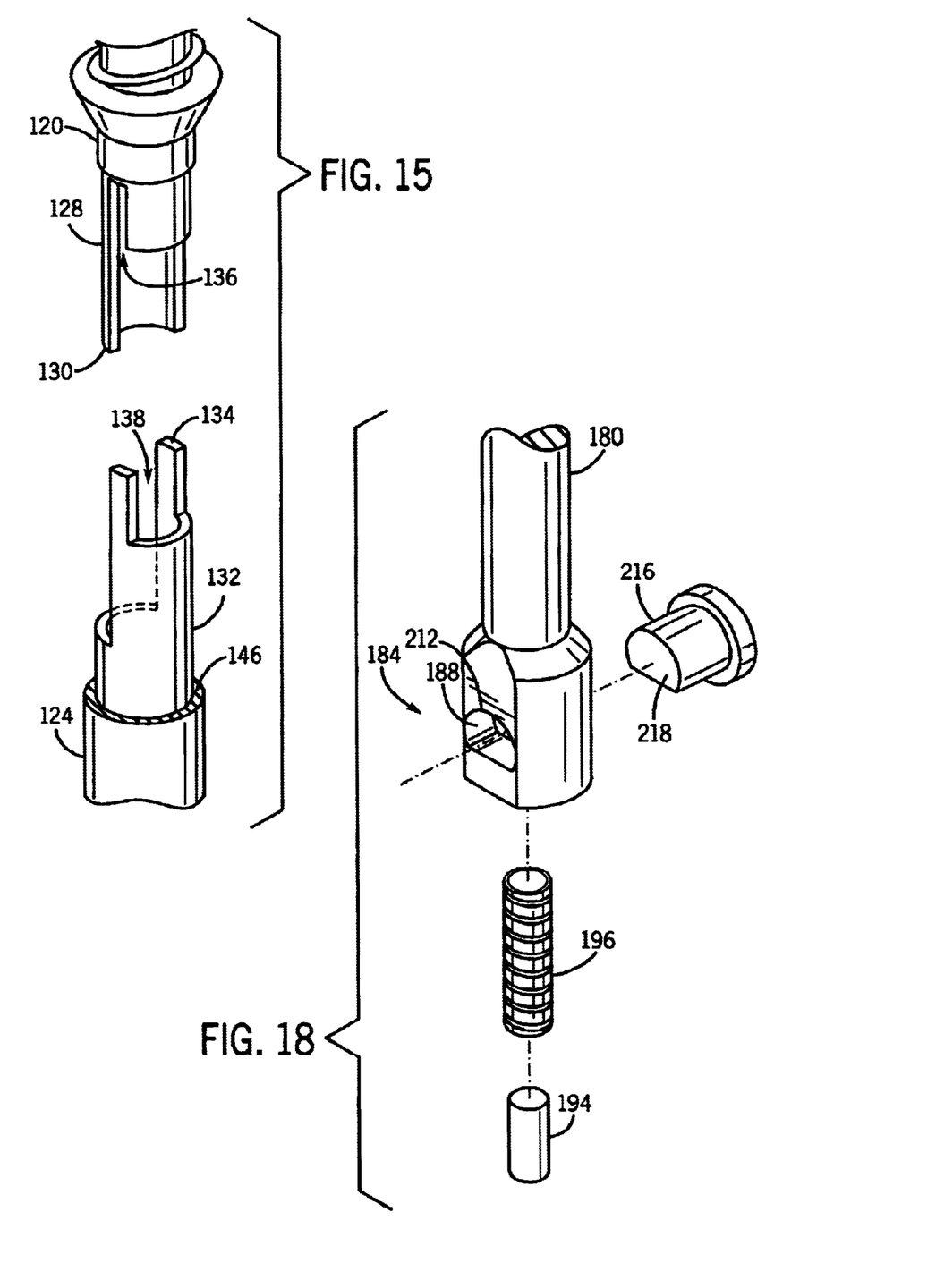
FIG. 15 is an exploded perspective view of a portion of the structure of FIG. 11 further illustrating the construction thereof.
FIG. 18 is an exploded perspective view of a portion of the structure of FIG. 17.
Figure 16:
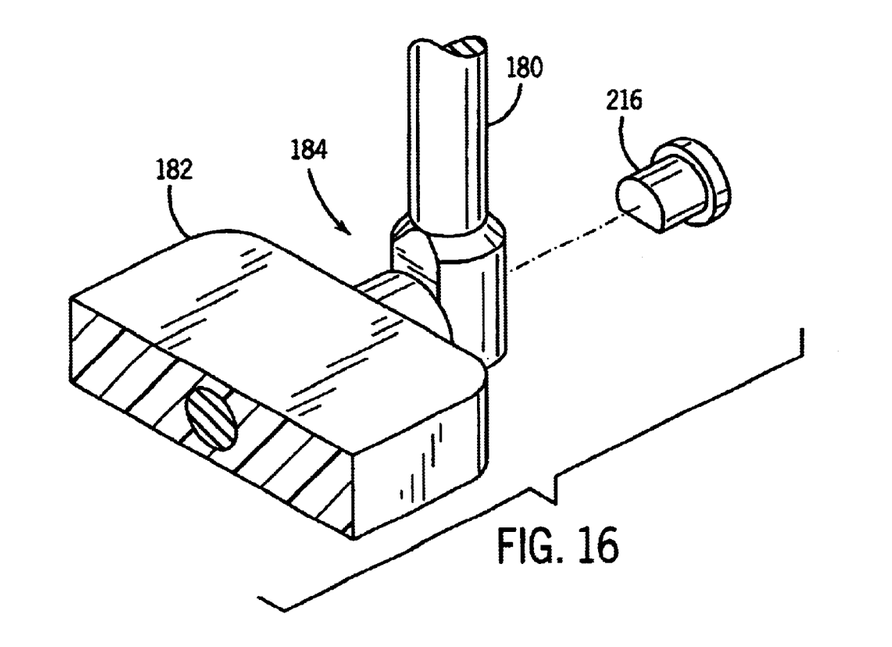
FIG. 16 is a perspective view of a portion of the structure of FIG. 1.

Stem 120 is an axially extending tubular member having a cylindrical sidewall 128, FIGS. 10, 11, 15, and a lower end 130. Yoke 124 is an axially extending tubular member having a cylindrical sidewall 132 and an upper end 134. Stem 120 mates with yoke 124 in keyed nested relation at mating slots 136 and 138 respectively extending from ends 130 and 134, preventing relative rotation therebetween about steering axis 112.

Figures 12, 13, 14:
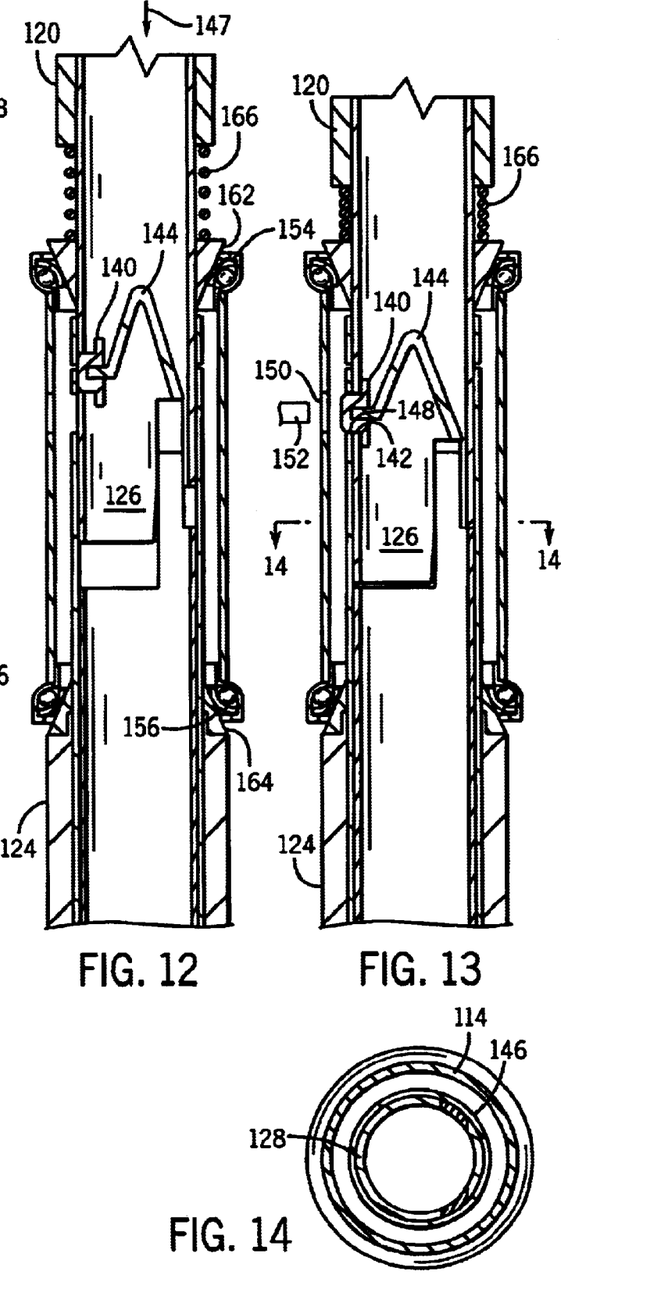

Stem 120 has a locking member 140, FIG. 13, engaging yoke 124 upon axial insertion, FIGS. 11, 12, and engagement of stem 120 and yoke 124 in headtube 110, and preventing axial separation of stem 120 and yoke 124 and withdrawal from headtube 110. Sidewall 128 of stem 120 has a first aperture 142 therethrough. Locking member 140 is a pin or button radially biased by spring clip 144 to protrude through aperture 142 (leftwardly in FIGS. 11–13). Yoke 124 has a tubular sleeve 146 extending along and axially beyond sidewall 132 of yoke 124 and receiving and axially slidable along stem 120. Sleeve 146 is rigidly mounted to cylindrical sidewall 132, e.g. by welding. Sleeve 146 has a second aperture 148 therethrough radially aligned with first aperture 142, FIG. 13, upon completion of axial insertion 147. Locking member button 140 protrudes through first and second apertures 142 and 148, FIG. 13, to lock stem 120 to yoke 124. Sleeve 146 is an outer sleeve circumscribing sidewall 132 of yoke 124, and locking member button 140 is biased radially outwardly through apertures 142 and 148. In an alternate embodiment, locking member 140 is provided on yoke 124.

Cylindrical sidewall 114 of headtube 110 has an access aperture 150, FIG. 13, therethrough providing access to locking member button 140 by a tool in the form of a rod 152 radially inserted (rightwardly in FIG. 13) through access aperture 150 to engage and depress locking member button 140 radially inwardly (rightwardly) out of aperture 148, to permit axial separation and withdrawal of stem 120 and yoke 124. A pre-load band 154, FIG. 11, around cylindrical sidewall 128 of stem 120 holds locking member button 140 depressed radially inwardly in aperture 142 prior to the noted axial insertion 147. Band 154 is engaged by sleeve 146 of yoke 124 upon the noted insertion to axially slide along (upwardly in FIG. 12) cylindrical sidewall 128 of stem 120, to release locking member button 140 such that locking member button 140 moves radially outwardly (leftwardly in FIG. 13) through first aperture 142 and into second aperture 148 to lock stem 120 and yoke 124 together.

Upper end 116 of headtube 110 has an upper headtube bearing 154, FIG. 11, facing inwardly and upwardly. Lower end 118 of headtube 110 has a lower headtube bearing 156 facing inwardly and downwardly. Bearings 154, 156 may be O-rings with races, a ball bearing string, or the like. The bearings may be held in place by locking tabs such as 158 and 160, FIG. 10 or by snap or clip rings or the like. Stem 120 has a stem bearing 162, FIG. 11, therearound facing outwardly and downwardly and engaging upper headtube bearing 154, FIG. 12, upon insertion. Bearing 162 is a collar slidable along cylindrical sidewall 128 of stem 120. Yoke 124 has a yoke bearing 164 therearound facing outwardly and upwardly and engaging lower headtube bearing 156. Bearing 164 is rigidly fixed to yoke 124. A bearing biasing member in the form of helical compression spring 166 around cylindrical sidewall 128 bears axially between shoulder 168 of stem 120 and stem bearing 162 and biases stem bearing 162 axially toward yoke bearing 164. Upon the noted axial insertion 147, FIG. 11, stem bearing 162 initially engages upper headtube bearing 154, FIG. 12, and upon continued axial insertion, FIG. 13, stem bearing 162 remains in engagement with upper headtube bearing 154 and also axially slides along (upwardly in FIG. 13) cylindrical sidewall 128 of stem 120 against the bias of biasing spring 166, such that upon full axial insertion with locking member button 140 engaging yoke 124 at aperture 148, FIG. 13, bearing biasing member 166 maintains axial spacing of stem bearing 162 and yoke bearing 164 equal to the axial spacing of upper and lower headtube bearings 154 and 156, thus providing desirable bearing loading.

Tool-free stem-to-yoke mounting assembly 126 mounts stem 120 to yoke 124 within headtube 110 with snap-in insertion. Locking member button 140 snaps in to aperture 148 with an audible and tactile click, providing positive feedback to the installer of successful assembly and installation. The insertion is unidirectional, and once the stem and yoke are inserted they are locked against withdrawal. Locking member button 140 and pre-load band 154 permit the noted insertion, and lock stem 120 against withdrawal from yoke 124 and lock stem 120 and yoke 124 against withdrawal from headtube 110, all without tools. The release mechanism enabled by access through hole 150 and the requirement of a tool to unlock stem 120 from yoke 124 and stem 120 and yoke 124 from headtube 110 after insertion are considered a desirable advantage, particularly for parents of young children as riders. Access hole 150 is typically covered by a decal or a plug which is removed to provide the noted access for disassembly. Pre-load or release band 154 holds locking member button 140 in its release position prior to installation insertion, and during installation insertion is engaged by sleeve 146 of yoke 124 to release locking member button 140 to move to its locking position, FIG. 13, engaging yoke 124 at aperture 148 of sleeve 146 and locking stem 120 to yoke 124.

Cycle 30, FIG. 1, has an opposing pair of right and left cranks with pedals for engagement by the feet of a rider for manual propulsion. One of the cranks, namely the right crank 180, and the right pedal 182, are shown in FIG. 1. A tool-free pedal-to-crank mounting assembly 184, FIGS. 16–21, mounts pedal 182 to crank 180 with an insertion motion requiring no tools, to be described. The left pedal is mounted in like manner to the left crank.

Figure 21:
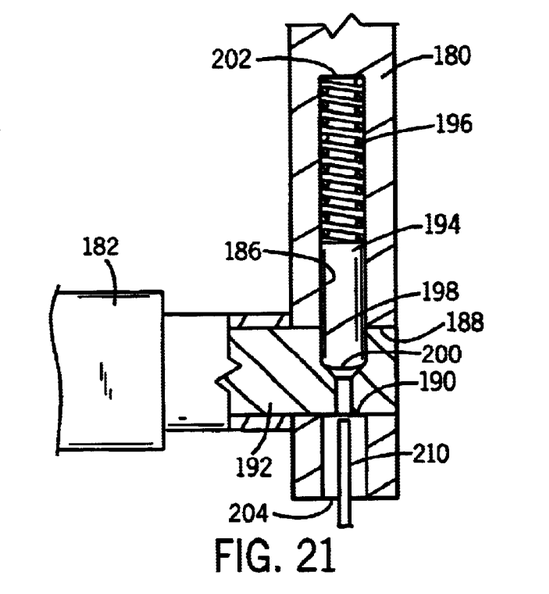

The pedal-to-crank mounting assembly includes first and second intersecting bores 186 and 188, FIG. 21, in crank 180. First bore 186 extends along an axial direction (up-down in FIG. 21). Second bore 188 extends laterally and crosses first bore 186 at a common intersection 190. Pedal 182 has a pedal shank 192, FIG. 17, extending into a crank bore provided by bore 188. Crank 180 has a locking member 194, FIGS. 18, 21, engaging pedal shank 192 upon insertion 193 of pedal shank 192 (rightwardly in FIGS. 17, 20) into crank bore 188 to lock pedal shank 192 in crank bore 188. Locking member 194 is provided by a pin in first bore 186 and axially slidable therealong and biased by compression biasing spring 196 toward common intersection 190. Pedal shank 192 extends into second bore 188 and into common intersection 190. A third bore 198, FIGS. 17, 19, in pedal shank 192 receives pin 194 axially biased into third bore 198 to lock pedal shank 192 in bore 188. Bore 198 has an axially facing stop surface 200 engaging and stopping pin 194 to limit axially biased movement of the pin. Bore 186 extends between first and second axial ends 202 and 204. First end 202 is closed. Second end 204 is open. Bore 186 is coaxial with bore 186 in common intersection 190 in inserted installed assembled condition, FIG. 21. Bore 198 extends axially between first and second axial ends 206 and 208, FIG. 19. Each of the first and second ends 206 and 208 of bore 198 are open. Biasing spring 196 in bore 186 bears between pin 194 and first end 202 of bore 186 and biases pin 194 toward common intersection 190 and into bore 198 in assembled condition through first end 206 of bore 198.

Pin 194 is accessible through second end 204 of bore 186 and second end 208 of bore 198 by inserting a tool in the form of a rod 210, FIG. 21, axially upwardly in FIG. 21 into bore 186 through second end 204 and axially into bore 198 through second end 208 to axially push pin 194 out of bore 198 against the bias of spring 196, to unlock pedal shank 192 from crank 180 and permit withdrawal of pedal shank 192 laterally leftwardly in FIG. 21 along and out of bore 188.

Figure 17:
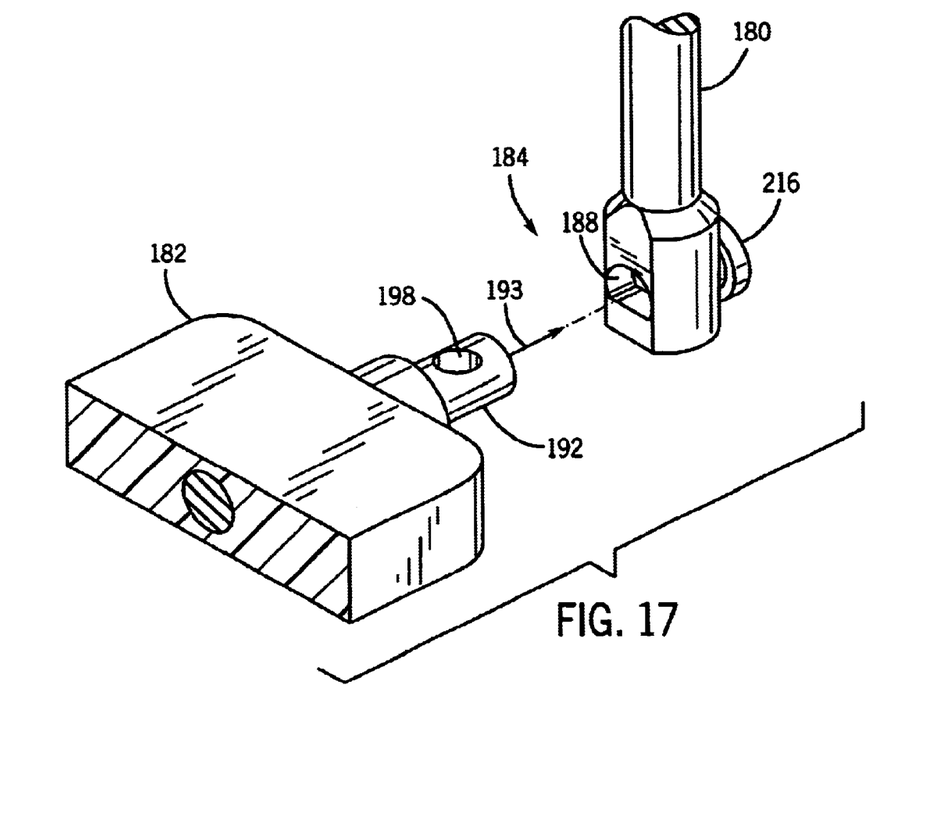
FIG. 17. is an exploded perspective view illustrating assembly of the structure of FIG. 16.
Figure 19:
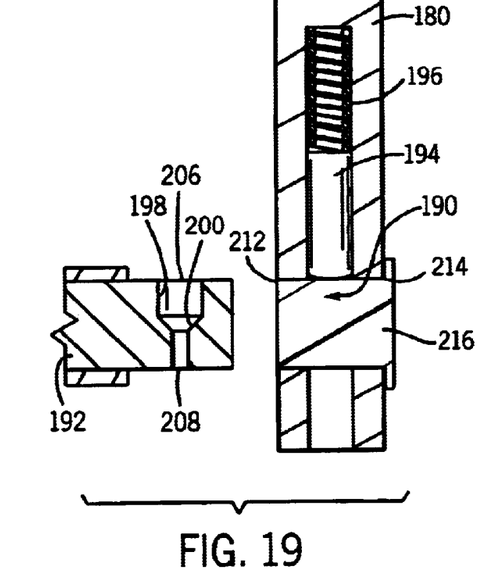
FIG. 19 is a sectional view of the structure of FIG. 17.
Figure 20:
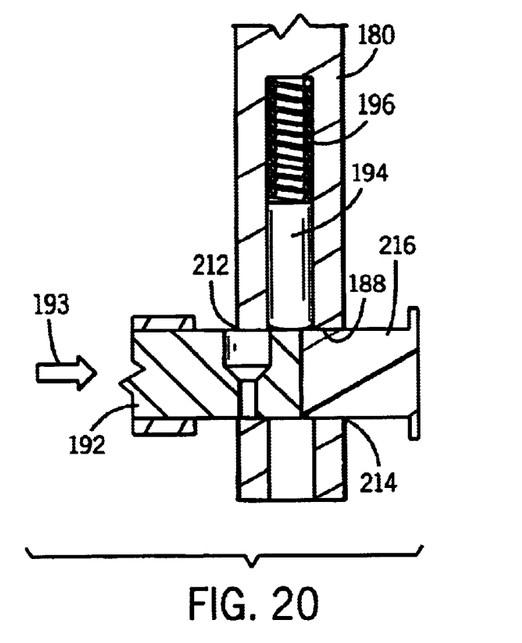
FIG. 20 is like FIG. 19 and shows the structure during assembly.

Bore 188 extends laterally between first and second ends 212 and 214, FIGS. 18, 19. Each of first and second ends 212 and 214 is open. A pre-load or release plug 216, FIGS. 17–19, is insertable laterally into bore 188 through second end 214 to hold pin 194 in a retracted withdrawn position, FIG. 19, against the bias of spring 196 and out of common intersection 190. This is the pre-assembly condition in which the cycle is shipped. This construction permits insertion of pedal shank 192 laterally rightwardly in FIGS. 17 and 20 as shown at arrow 193 into and along bore 188 through its first end 212 without being blocked by pin 194. During insertion of pedal shank 192 laterally rightwardly into and along bore 188 through its first end 212, pedal shank 192 engages plug 216 and pushes the plug out of bore 188 through its second end 214, to release pin 194 such that the pin slides axially downwardly in FIGS. 16 and 21 into bore 198 to lock pedal shank 192 in bore 188. Insertion of pedal shank 192 into bore 188 through its first end 212 and the expulsion of plug 216 from bore 188 through its second end 214 is a single unidirectional rectilinear motion requiring no tools.

Pedal shank 192 and bore 188 are complementally shaped in keyed configuration to each other to prevent rotation of pedal shank 192 in bore 188 and to coaxially align bore 198 with bore 186 for receipt of pin 194 in bore 198. In preferred form, the keyed configuration is a D-shape 218, FIG. 18, though other configurations or keyway slots or the like may be used. In another alternate embodiment, the locking member is provided on the pedal shank 192, and a locking bore is provided in the crank.

Tool-free pedal-to-crank mounting assembly 184 mounts pedal 182 to crank 180 with snapin insertion. The assembly provides an audible and tactile click during insertion assembly as pin 194 snaps in to bore 198, to provide positive feedback of a successfully completed installation. The insertion is unidirectional, and once the pedal shank 192 is inserted it is locked against withdrawal in the opposite direction. The locking mechanism provided by pin 194 and plug 216 permits the noted insertion and locks pedal 182 against withdrawal from crank 180, all without tools. The noted release mechanism accessible by and requiring a tool 210 to unlock pedal 182 from crank 180 after the noted insertion is desirable, particularly for young children riders. Pre-load release plug 216 holds locking member 194 in its release position, FIG. 19, and is engaged by the pedal during the noted insertion motion to release the locking member 194 to its locking position, FIG. 21, engaging the pedal shank and locking same to the frame.

In the preferred assembly sequence, the trainingwheels are initially installed, followed by installation of the stem and fork assembly, followed by installation of the pedals. However, any installation sequence of these steps may be utilized. Snap-in engagement of spring tab 56 into notches 72, 74, 76 upon respective alignment thereof, and snap-in engagement of locking button 140 into aperture 148 upon alignment of apertures 142 and 148, and snap-in engagement of locking pin 194 into bore 198 upon alignment of bores 186 and 198, provides affirmative installation feedback by an audible and tactile click confirming the noted alignment and engagement, and proper, successful installation. Each step is a simple single snap-in unidirectional rectilinear insertion requiring no tools. Desirably, a tool is needed for disassembly.

It is recognized that various equivalents, alternatives and modifications are possible within the scope of the appended claims.

What is claimed is:

1. In a wheeled cycle having an opposing pair of cranks with pedals for engagement by the feet of a rider for manual propulsion, a tool-free pedal-to-crank mounting assembly mounting said pedal to said crank with an insertion motion requiring no tools, a locking mechanism permitting said insertion and locking said pedal against withdrawal from said crank, all without tools, and a release mechanism accessible by and requiring a tool to unlock said pedal from said crank after said insertion.

2. In a wheeled cycle having an opposing pair of cranks with pedals for engagement by the feet of a rider for manual propulsion, a pedal-to-crank mounting assembly comprising a crank bore in said crank, a pedal shank extending into said crank bore, one of said crank and said pedal shank having a locking member engaging the other of said crank and said pedal shank upon insertion of said pedal shank into said crank bore to lock said pedal shank in said crank bore, wherein said locking member is biased to a locking position engaging said other of said crank and said pedal shank, and has a release position retracted against said bias to disengage said other of said crank and said pedal shank, and comprising a pre-load mechanism holding said locking member in said release position during and permitting said insertion and engaged by said other of said crank and said pedal shank to release said locking member to said locking position.

3. In a wheeled cycle having an opposing pair of cranks with pedals for engagement by the feet of a rider for manual propulsion, a pedal-to-crank mounting assembly comprising a crank bore in said crank, a pedal shank extending into said crank bore, one of said crank and said pedal shank having a locking member engaging the other of said crank and said pedal shank upon insertion of said pedal shank into said crank bore to lock said pedal shank in said crank bore, wherein said locking member is biased to a locking position engaging said other of said crank and said pedal shank, and has a release position retracted against said bias to disengage said other of said crank and said pedal shank, and comprising a release mechanism accessible after said insertion to engage said locking member and move said locking member from said locking position to said release position against said bias, to permit withdrawal of said pedal shank from said crank bore.

4. In a wheeled cycle having an opposing pair of cranks with pedals for engagement by the feet of a rider for manual propulsion, a pedal-to-crank mounting assembly comprising a crank bore in said crank, a pedal shank extending into said crank bore, one of said crank and said pedal shank having a locking member engaging the other of said crank and said pedal shank upon insertion of said pedal shank into said crank bore to lock said pedal shank in said crank bore, wherein said pedal-to-crank mounting assembly comprises first and second intersecting bores in said crank, said first bore extending axially, said second bore extending laterally and crossing said first bore at a common intersection, said second bore being said crank bore, said locking member comprising a pin in said first bore and axially slidable therealong and biased toward said common intersection, said pedal shank extending into said second bore and into said common intersection, a third bore in said pedal shank and receiving said pin axially biased into said third bore to lock said pedal shank in said second bore.

5. The cycle according to claim 4 wherein said third bore has an axially facing stop surface engaging and stopping said pin to limit axially biased movement of said pin.

6. The cycle according to claim 4 wherein said first bore extends axially between first and second axial ends, said first end being closed, said second end being open, said third bore is co-axial with said first bore in said common intersection and extends axially between first and second axial ends, each of said first and second ends of said third bore being open.

7. The cycle according to claim 6 comprising a biasing member in said first bore between said pin and said first end of said first bore and biasing said pin toward said common intersection and into said third bore through said first end of said third bore, and wherein said pin is accessible through said second end of said first bore and said second end of said third bore by inserting a tool in the form of a rod axially into said first bore through said second end of said first bore and axially into said third bore through said second end of said third bore to axially push said pin out of said third bore against the bias of said biasing member, to unlock said pedal shank from said crank and permit withdrawal of said pedal shank laterally along and out of said second bore.

8. The cycle according to claim 4 wherein said second bore extends laterally between first and second ends, each of said first and second ends being open.

9. The cycle according to claim 8 comprising a plug insertable laterally into said second bore through said second end to hold said pin in a retracted withdrawn position against said bias and out of said common intersection, such that insertion of said pedal shank laterally into and along said second bore through said first end is permitted without being blocked by said pin, and wherein during said insertion of said pedal shank laterally into and along said second bore through said first end, said pedal shank engages said plug and laterally pushes said plug out of said second bore through said second end, to release said pin such that said pin slides axially into said third bore to lock said pedal shank in said second bore.

10. The cycle according to claim 9 wherein said insertion of said pedal shank into said second bore through said first end and the expulsion of said plug from said second bore through said second end is a single unidirectional rectilinear motion requiring no tools.

11. The cycle according to claim 4 wherein said pedal shank and said second bore are complementally shaped in keyed configuration to each other to prevent rotation of said pedal shank in said second bore and to co-axially align said third bore with said first bore for receipt of said pin in said third bore.

12. The cycle according to claim 11 wherein said keyed configuration is a D-shape.

13. A tool-free assembly method for a wheeled cycle having an opposing pair of cranks with pedals for engagement by the feet of a rider for manual propulsion, said method comprising mounting said pedal to said crank with an insertion motion requiring no tools, and comprising requiring a tool to unlock said pedal from said crank, and unlocking said pedal from said crank with said tool after said insertion.

14. A tool-free assembly method for a wheeled cycle having an opposing pair of cranks with pedals for engagement by the feet of a rider for manual propulsion, said method comprising mounting said pedal to said crank with an insertion motion requiring no tools, and comprising providing a biased locking member having a locking position and a release position, providing a release plug, holding said locking member in said release position with said release plug, engaging said release plug with said pedal during said insertion to move said release plug out of engagement with said locking member and release said locking member to said locking position engaging said pedal and locking said pedal to said crank.

15. The method according to claim 14 comprising releasing said pedal from said crank by engaging said release member with a tool to move said release member to said release position to permit withdrawal of said pedal from said crank.

16. A tool-free assembly method for a wheeled cycle having an opposing pair of cranks with pedals for engagement by the feet of a rider for manual propulsion, said method comprising mounting said pedal to said crank with an insertion motion requiring no tools, and comprising providing a crank bore in said crank, providing a pedal shank extending into said crank bore, providing one of said crank and said pedal shank with a locking member engaging the other of said crank and said pedal shank upon insertion of said pedal shank into said crank bore to lock said pedal shank in said crank bore, providing first and second intersecting bores in said crank, said first bore extending axially, said second bore extending laterally and crossing said first bore at a common intersection, said second bore being said crank bore, providing said locking member as a pin in said first bore and axially slidable therealong, biasing said pin toward said common intersection, inserting said pedal shank into said second bore and into said common intersection, providing a third bore in said pedal shank and receiving said pin axially biased into said third bore to lock said pedal shank in said second bore.

17. The method according to claim 16 wherein said second bore extends laterally between first and second ends, each of said first and second ends being open, providing a release plug in said second bore and said common intersection and holding said pin in a retracted withdrawn position against said bias and out of said common intersection, inserting said pedal shank laterally into and along said second bore through said first end such that during said insertion said pedal shank engages said release plug and laterally pushes said plug out of said second bore through said second end, to release said pin such that said pin slides axially into said third bore to lock said pedal shank in said second bore.

18. The method according to claim 16 comprising complementally shaping said pedal shank and said second bore in keyed relation to each other to prevent rotation of said pedal shank in said second bore and to coaxially align said third bore with said first bore for receipt of said pin in said third bore.

* * * * *